US 7,509,529 B2

(12) United States Patent
Colucci et al.

(10) Patent No.: US 7,509,529 B2
(45) Date of Patent: Mar. 24, 2009

(54) SYSTEM AND METHOD FOR PERFORMING USER RECOVERY OF GUIDED PROCEDURES FOR AN UNINTERRUPTIBLE POWER SUPPLY

(75) Inventors: David A. Colucci, Stoneham, MA (US); Neil Rasmussen, Concord, MA (US)

(73) Assignee: American Power Conversion Corporation, West Kingston, RI (US)

( * ) Notice: Subject to any disclaimer, the term of this patent is extended or adjusted under 35 U.S.C. 154(b) by 312 days.

(21) Appl. No.: 10/622,952

(22) Filed: Jul. 18, 2003

(65) Prior Publication Data

US 2005/0015682 A1 Jan. 20, 2005

(51) Int. Cl.
*G06F 11/00* (2006.01)
*G06F 11/32* (2006.01)

(52) U.S. Cl. .................... 714/14; 714/22; 715/709

(58) Field of Classification Search .................. 714/14, 714/22, 24; 715/705, 707–709, 961, 965, 715/966

See application file for complete search history.

(56) References Cited

U.S. PATENT DOCUMENTS

| | | | | |
|---|---|---|---|---|
| 4,500,964 A | * | 2/1985 | Nickle | 714/46 |
| 5,018,082 A | * | 5/1991 | Obata et al. | 715/707 |
| 5,673,028 A | * | 9/1997 | Levy | 340/635 |
| 5,781,191 A | * | 7/1998 | Mayuzumi et al. | 715/705 |
| 5,825,356 A | * | 10/1998 | Habib et al. | 715/712 |
| 6,038,618 A | * | 3/2000 | Beer et al. | 710/18 |
| 6,381,156 B1 | * | 4/2002 | Sakai et al. | 363/65 |
| 6,492,999 B1 | * | 12/2002 | Fado et al. | 715/727 |
| 7,257,741 B1 | * | 8/2007 | Palenik et al. | 714/43 |
| 2002/0122050 A1 | * | 9/2002 | Sandberg | 345/705 |
| 2002/0138785 A1 | * | 9/2002 | Hammond et al. | 714/14 |
| 2003/0090503 A1 | * | 5/2003 | Leapman | 345/705 |
| 2004/0078708 A1 | * | 4/2004 | Li et al. | 714/43 |
| 2004/0090449 A1 | * | 5/2004 | MacLellan | 345/709 |

OTHER PUBLICATIONS

Microsoft Compute Dictionary Fifth Edition Published by Microsoft Press, 2002 ISBN 0-7356-1495-4.*
Wikipedia's Uninterruptible Power Supply revision from Jun. 15, 2003 found at URL: http://en.wikipedia.org/w/index.php?title=Uninterruptible_power_supply&oldid=1292004.*
Installing An Internal Modem from Beyond the Basics, vol. 6 Issue 6, Jun. 1995 found at URL: http://www.smartcomputing.com/editorial/article.asp?article=articles/1995/jun95/pcn0624/pcn0624.asp&articleid=3099&guid=.*
'678': The 666 of DSL Users by Michelle Delio Wired.com published May 28, 2002 http://www.wired.com/print/science/discoveries/news/2002/05/52756.*

* cited by examiner

*Primary Examiner*—Scott T. Baderman
*Assistant Examiner*—Joseph Schell
(74) *Attorney, Agent, or Firm*—Lowrie, Lando & Anastasi, LLP

(57) ABSTRACT

A processor embedded in a device includes instructions for procedures to be completed by a user. A display provides the instructions as steps for completion to the user. The processor monitors status of the device to determine completion of the steps before proceeding with the next step. Errors in performing steps are identified by the processor and steps to correct the errors are displayed for execution by the user.

5 Claims, 4 Drawing Sheets

SYSTEM AND METHOD FOR PERFORMING USER RECOVERY OF GUIDED PROCEDURES FOR AN UNINTERRUPTIBLE POWER SUPPLY

BACKGROUND OF THE INVENTION

1. Field of the Invention

The present invention relates generally to user guides. More particularly, it relates to a system for providing real time guidance to a user performing a set of process steps in connection with setting the status of a product, such as an uninterruptible power supply.

2. Discussion of Related Art

An uninterruptible power supply (UPS) is used in conjunction with electronic equipment to provide backup power in the event of loss of or problems with a primary power source, typically utility power. While a UPS can be used to provide power to any type of electronic equipment, typically they are used in conjunction with computer systems. The UPS receives power from the utility by being plugged into an outlet or hardwired into the power system for the building. The UPS provides output power to one or more computers and peripheral equipment through power outlets.

Typically, the UPS includes a battery as a source of backup power and an inverter for converting the battery power into regular 110 volt (or other applicable voltage), AC power for use by the computer equipment. The UPS monitors the input power from the utility to determine its continuing supply and condition. In the event of power failure, the UPS switches to the battery backup power source. The backup power source is used until utility power returns or the battery is drained. If the power failure continues for a significant time, so that the battery becomes drained, the UPS shuts off to prevent damage to the battery. In the event of a power failure, the computer equipment can continue to be used until the UPS shuts off. The time period until shut off depends upon the condition of the battery, the charge on the battery, and the amount of power being utilized by the computer equipment. The UPS may also be used to condition the power to correct for over or under voltage conditions.

Originally, a UPS used visual or audio signals to indicate a power failure. The computer user would have to monitor the system to determine when to shut down the computer so as to prevent loss of data prior to shut down of the UPS. More sophisticated UPSs have been developed which include microprocessors for monitoring operation of the UPS to determine the current state, changes in state, and to perform diagnostic self-tests. These UPSs typically included a communication link to the computer system to provide information relating to its states. UPS control and monitoring software operating on the computer system operates to store, analyze, and display information for a user regarding the condition, status, and operation of the UPS. The UPS control software may also function to shut down the computer system prior to a shut down of the UPS, when on backup power.

More sophisticated UPSs provide greater flexibility and control. The UPS, and the control and monitoring software, may be set to various states which control the coordinated operation. For example, different conditions may be set for determining when to shut down. In many situations, a user must perform a series of steps to set the UPS status. Errors in performing the process steps may cause the UPS to be placed in an incorrect status. However, the user has no easy mechanism for determining when an error has been made. Thus, the user may have to repeat the process to set the correct status.

Many other devices also require a user to perform a series of process steps to perform a desired operation. Typically, the proper procedure is provided in written documentation, such as a User's Guide or Operator's Manual. The user must locate the proper documentation and the procedure within that documentation. The user must then follow each of the written steps in order. Any errors in performance of each of the steps prevent the procedure from being performed properly and cause the device to be improperly set. Such errors typically require the user to repeat the procedure, possibly with the same errors. The user has no guidance with respect to any errors or how to correct them.

SUMMARY OF THE INVENTION

The present invention includes, according to one aspect, a system for providing guidance to a user during performance of process steps. The system includes a controller embedded in the device for monitoring the status of the device. The user interface associated with the controller identifies a step in a process. The user interface may display the step on an integrated display or on an attached device or computer. The controller determines performance of the process step based upon monitoring status of the device. When a process step is performed, the controller provides the next step to the user. According to another aspect of the invention, the controller may determine that an error had occurred. The instructions to the user may include steps to correct any errors.

According to another aspect of the invention, the controller can display the entire process to the user at any time during performance of the process. According to another aspect of the invention, the system determines whether a non-recoverable error has occurred and stops the procedure upon a non-recoverable error. According to another aspect of the invention, the next process step depends upon a status of the device.

The present invention also includes, according to another aspect, a method for guided performance of a multi-step procedure on a device by a user. The method includes providing the user with individual steps of the procedure and monitoring the device to determine proper performance of the step. Upon completion of a step, the next step is provided to the user for execution. According to another aspect of the invention, if a step is not completed correctly, a proper error correction process is provided to the user. According to another aspect of the invention, an entire list of steps for the procedures are displayed.

DETAILED DESCRIPTION

Figure 1:
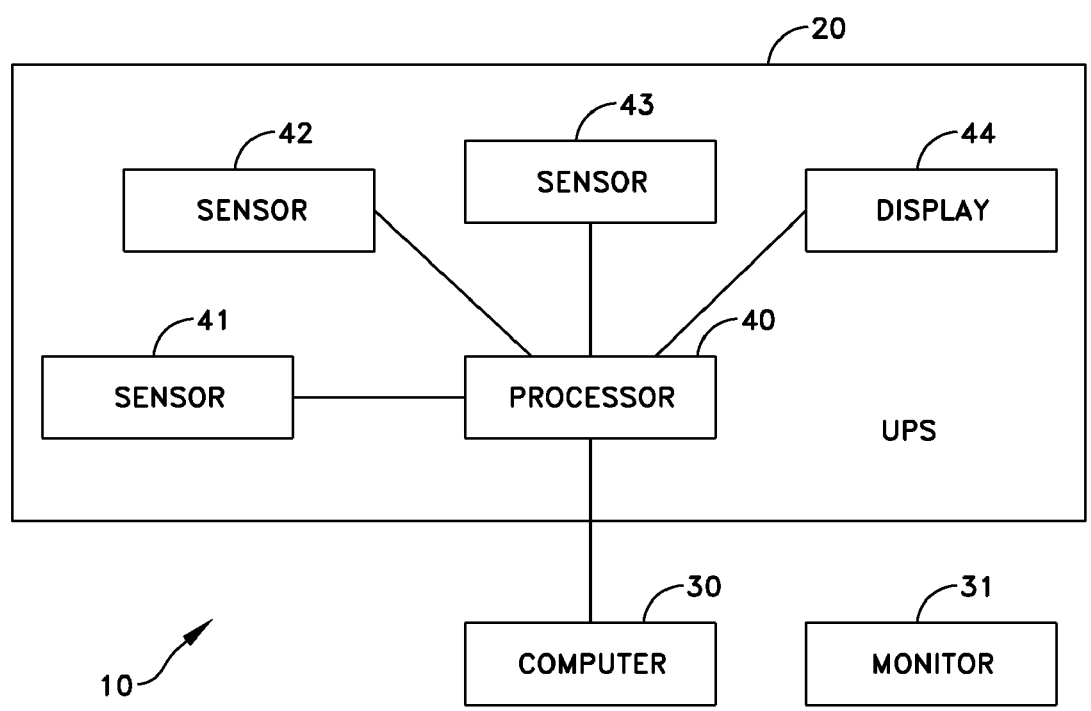
FIG. 1 is block diagram of the relevant portions of UPS hardware according to embodiment of the present invention.

The procedure guidance system and method of the present invention is applicable to different types of devices. FIG. 1 illustrates the system 10 according to an embodiment of the invention implemented in an uninterruptible power supply (UPS) 20. The UPS 20 includes typical elements (not shown) applicable to a UPS. The present invention is illustrated with respect to a UPS, but is not so limited. It may be utilized in any type of device requiring a user to perform steps of one or more procedures. Any other type of device to which the present invention is applied necessarily includes components applicable to such a device. The UPS 20 is connected to a computer 30 to provide power and communications, according to known practice. The UPS 20 further includes a processor 40. The processor 40 may be of any known type, including a properly programmed microprocessor or integrated circuit. Furthermore, the processor 40 may be implemented by proper programming of a processor inherently present in the UPS 20. The processor 40 is connected to one or more sensors 41, 42, 43. The sensors 41, 42, 43 provide information to the processor relating to the operation or status of components of the UPS 20. The sensors 41, 42, 43 determine the status of mechanical contacts, switches, or electrical measurements such as voltage, power, and current. A UPS 20 typically includes various such sensors which can be utilized in the present invention. Alternatively, the system 10 may include sensors specially provided for determining the status of the UPS in connection with determining completion of the procedure steps.

The system 10 may include a display 44 in the UPS 20 connected to the processor 40. The display is used to provide process steps to the user for execution. Alternatively, the process steps are displayed on the monitor 31 associated with the computer 30 attached to the UPS 30.

Figure 2:
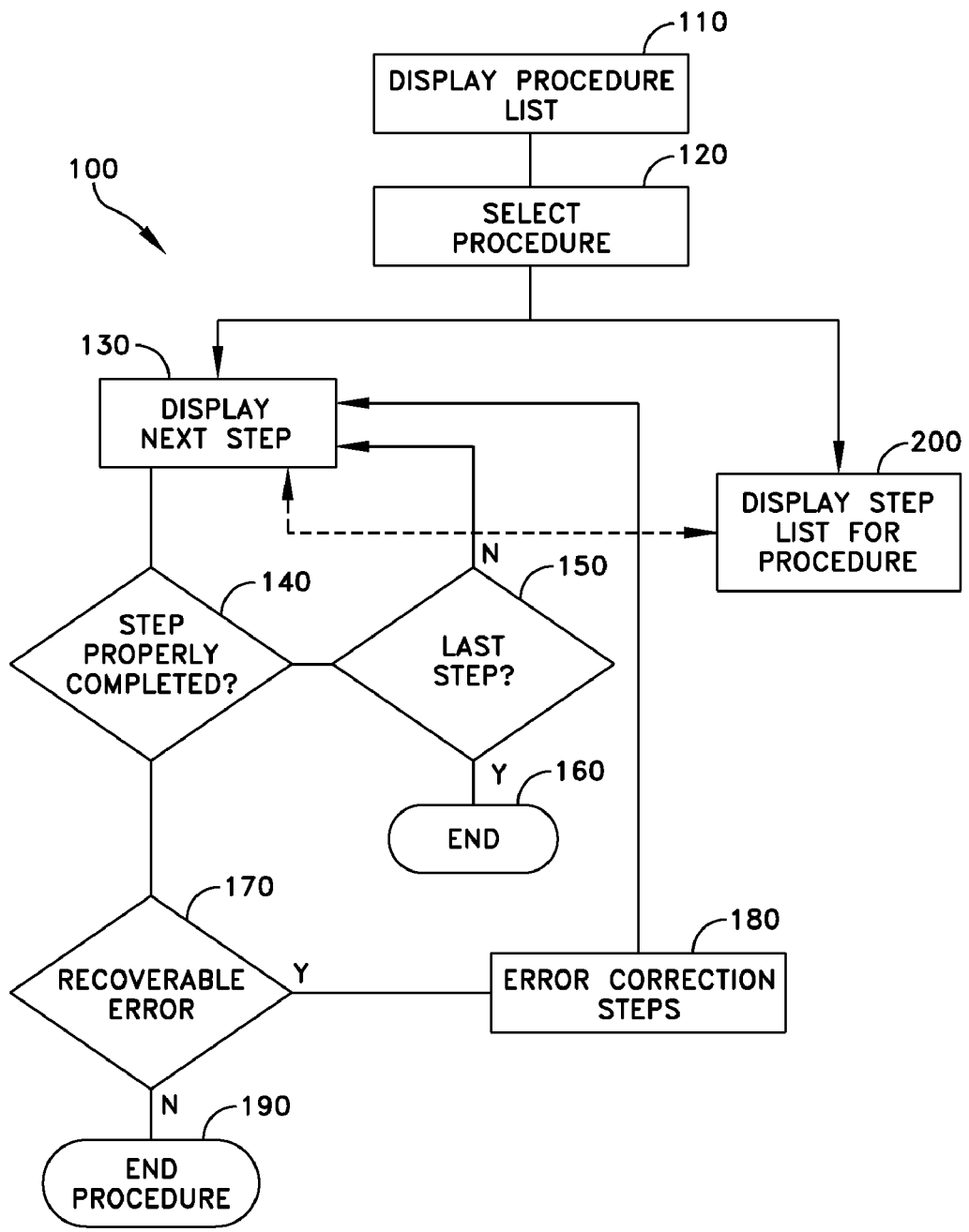
FIG. 2 is a block flow diagram of a method for guiding a user in process steps according to an embodiment of the present invention.

The process 100 executed by the processor 40 in connection with the present invention is illustrated in FIG. 2. At step 110, a list of procedures is displayed to the user. Depending upon the nature of the display 44 or the use of the monitor 31, the entire list may be displayed or one or more procedures may be displayed with a scrolling capability of viewing the list. At step 120, the user selects one of the procedures to be performed. The user may either begin performing the procedure at step 130 or may display the entire list of steps for the procedure, at step 200, for review prior to commencing. In order to perform the process, the first step in the procedure is displayed at step 130. The user can then perform the displayed step. The processor 30 uses the sensors 41, 42, 43 to determine whether the user performed the process step correctly. Alternatively, performance of the process step may not be determinable using the sensors or may display information to the user as part of the procedure. In such a case, the system 10 waits for the user to indicate completion of the displayed step by pressing a key or button (not shown) on either the UPS or the computer. The system may indicate on the display that the step has been properly completed, or may proceed with the next steps.

When the process step has been properly completed (step 140), the processor 40 determines whether the procedure includes additional steps, at step 150. When the last step is properly performed, the system ends operation at step 160. If the procedure includes additional steps, the next step is displayed at 130. Procedures in the present invention are not limited to a single path, but may include alternative paths. The next step to be displayed may depend upon the status of the device as determined by accessing one or more sensors 41, 42, 43 or upon inputs from the user. The user may input information to the system using a keypad of the UPS 20, or other device, or by using the computer 30.

If a process step has not been performed correctly, the system 10 may determine that an error has occurred. The system 10 determines the occurrence of an error based upon information from the sensors 41, 42, 43 which does not correspond to expected values for completion of the procedure steps. When an error occurs, the system 10 determines whether recovery is possible at step 170. Depending upon the nature of the procedure and the applicable steps, the user may be able to undo a step performed incorrectly, or may be able to repeat a step that was not properly performed. If recovery is possible, the processor 40 displays steps to the user to correct the error at step 180. Once the error has been corrected, the next step is displayed for execution by the user. If recovery is not possible, the procedure is terminated at step 190. Termination of the procedure may require the user to perform various steps to return the device to its former state. If so, the proper steps are displayed to the user for execution.

According to an embodiment of the invention, the entire list of steps corresponding to the procedure may be displayed at any time (step 200) during performance of the process steps. The display may include a scrolling function to review all of the steps on the procedure, and may include information regarding various alternative paths in the procedure. Following review of the steps in the procedure, the user can return to performance of the procedure. The system tracks the completed steps and returns to display of the correct next step following review of the procedure.

Figure 3:
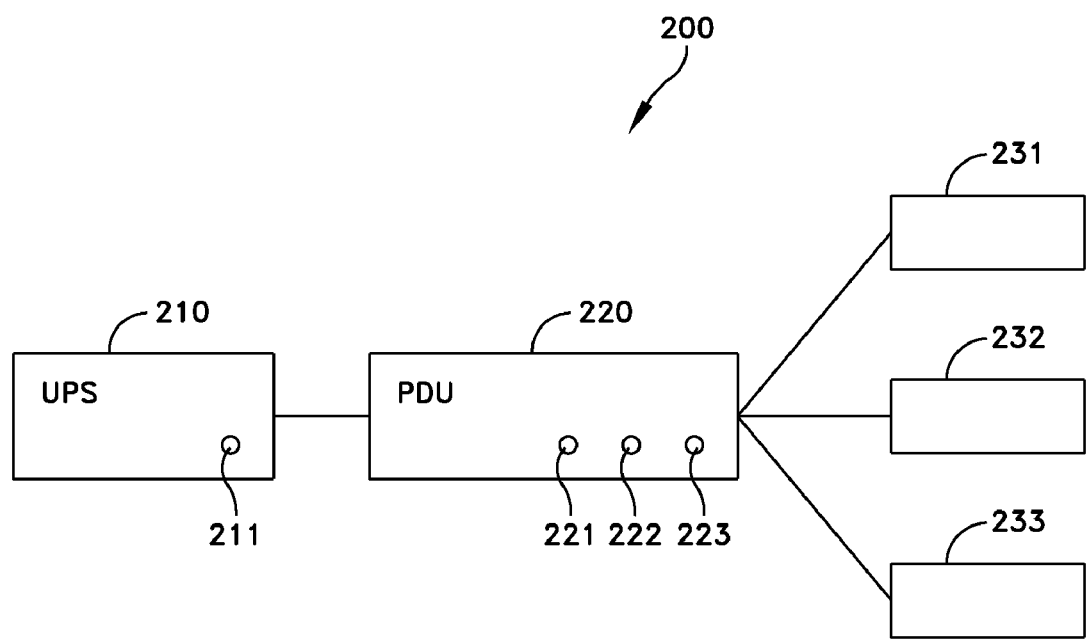
FIG. 3 is a block diagram of a UPS system with which the present invention may be implemented.

The present invention is not limited to a UPS, but may also include other equipment which incorporates a processor or other mechanism for determining states of the equipment. FIG. 3 illustrates in a simplified form a UPS system 200 including a UPS 210 and a power distribution unit (PDU) 220. The PDU 220 is positioned between the UPS 210 and a plurality of computers 231, 232, 233 or other electronic equipment. The PDU 220 includes a processor which monitors the various states of the PDU and which communicates with the UPS 210 and the computers 231, 232, 233. For illustrative purposes, a switch 211 is illustrated on the UPS 210 for placing the UPS 210 in a bypass state. Similarly, three switches 221, 222, 223 are illustrated on the PDU 220. Any number of switches may be included on the UPS 210 and PDU 220. Alternatively, the switches may be implemented within the devices and controlled by software within the system.

Figure 4:
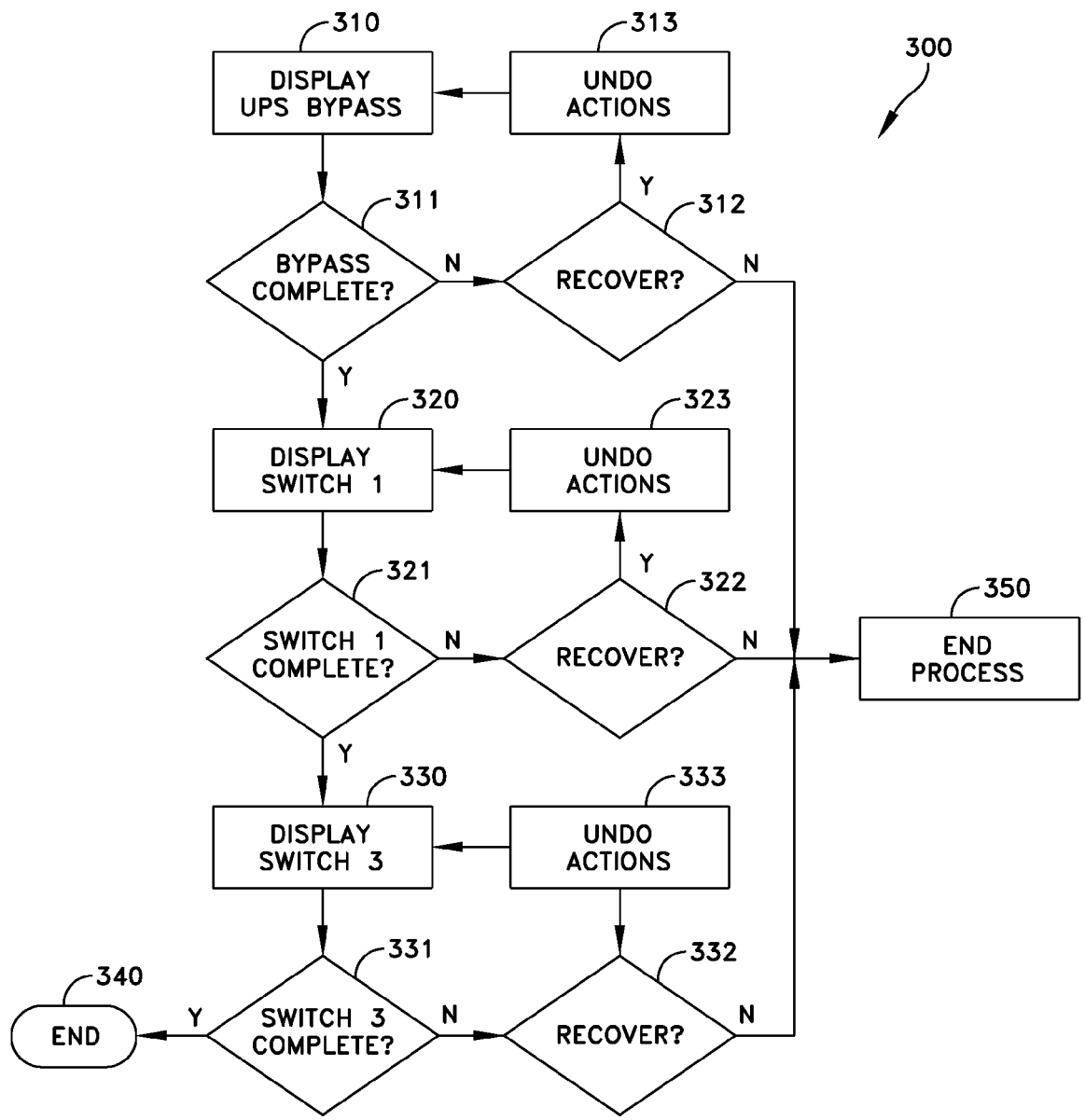
FIG. 4 is a block flow diagram of a method for guiding a user to set a bypass state in the UPS system of FIG. 3.

FIG. 4 illustrates a process 300 for placing the UPS system 200 in a bypass state in connection with the present invention. For illustrative purposes, the UPS system 200 is placed in the bypass state by using switch 211 on the UPS 210 to place the UPS in a bypass state. Then, the switches 221 and 223 are changed, in that order, into a bypass state. If the process is not performed correctly, the UPS system 200 may fail, i.e., suddenly stop providing power to the computers. Alternatively, depending upon the state of the switches, an error in the process may be reversible so that the process may continue. At step 310, an instruction is displayed to inform the user to operate switch 211 on the UPS 210 to place the UPS in the bypass state. The instruction may be displayed on one of the computers 231, 232, 233, on a display on the UPS 210 or PDU 220, or on some other monitor for providing instructions to a user. Following display of the instruction, the system waits, at step 311 until the user changes the switch 211. If the user properly changes the switch 211, the process continues to step 320. However, if the system determines that some other action occurred, such as the user changing switch 211 on the PDU 220, then the process proceeds to step 312. At step 312, the system determines whether the process can recover from the current state. If the process can recover, then the proper step to uncover, such as switching back switch 221, is displayed to the user. Of course, several steps may be required to recover from an error. In such a case, all of the steps would be displayed in order. Once the system has recovered from the error, the proper step 310 is displayed again to the user for execution. At step 312, if the system determines that the process cannot recover, then the process is terminated at step 350.

Once the user has successfully completed the first step of the process, the system displays the second step, operating switch 221, to the user for execution at step 320. The system then waits for the user to perform the desired action and monitors the status of the switches. As with the first action, if the user performs the correct action, the process continues to step 330. On the other hand, if the user performs an incorrect action, the process attempts to recover at steps 322 and 323 by having the user perform certain actions. As illustrated in FIG. 4, the system can return to the second step of the process in recovering from an error. Alternatively, the error recovery process could return the user to the first step of the process.

Once the user has successfully completed the second step of the process, the system displays the third step, operating switch 223. Again, the system waits for the user to perform the desired action, and seeks to recover from any errors. Once the third and final step has been properly performed, the process terminates at step 340.

FIGS. 3 and 4 illustrate a process for operating switches on a UPS 210 and a PDU 220 for placing the system in a bypass state. The present invention is not limited to this specific process. Other processes may be performed to place the UPS system in a bypass state. Alternatively, other processes be implemented using the present invention to place the UPS system in any desired state which requires actions by a user. A system according to an embodiment of the present invention displays steps to a user for performance and monitors the state of the system to determine whether the proper step has been performed. If an error is made, steps necessary to recover from the error, if possible, are displayed to the user. Thus, the user is guided through the proper steps of the process, while the system ensures that the steps are properly performed.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

The invention claimed is:

1. A system for guiding a user through performance of a procedure corresponding to an uninterruptible power supply associated with the system, the system comprising:
   at least one programmed processor embedded within or connected to the uninterruptible power supply;
   at least one sensor embedded within or connected to the uninterruptible power supply providing information regarding the status of the uninterruptible power supply, the programmed processor and the sensor being operatively coupled such that the programmed processor receives at least a portion of status information from the sensor;
   the programmed processor being configured to retrieve at least one stored procedure corresponding to the uninterruptible power supply including a plurality of steps to be performed by a user; and
   a display operatively coupled to the uninterruptible power supply for displaying the plurality of steps in order;
   the programmed processor being further configured to determine whether a currently displayed step has been properly performed based upon at least one of: (i) the information received from the sensor and (ii) one or more inputs entered by a user into the programmed processor, to determine whether a recovery from an error caused by a step which is not properly performed is possible, and, if recovery is possible, to provide one or more correctional steps, at least one of which is different from the displayed step, to correct the error by displaying the correctional steps to the user on the display;
   wherein the at least one stored procedure comprises a method for placing the uninterruptible power supply in a bypass state.

2. method of guiding a user through performance of a procedure corresponding to an uninterruptible power supply, the method comprising:
   selecting a procedure from a list of one or more procedures corresponding to an uninterruptible power supply;
   determining whether the step of the procedure has been properly performed;
   determining whether a recovery step is available in the event the step of the procedure is not properly performed;
   if a recovery step is available, displaying one or more correctional steps of the recovery step, at least one of which is different from the step of the procedure, to correct an error caused by a step of the procedure which is not properly performed; and
   displaying a next step of the procedure upon determining that the prior step has been properly performed,
   wherein the procedure comprises a method for placing the uninterruptible power supply in a bypass state.

3. The method of claim 2, wherein the determining whether the step of the procedure has been properly performed is determined by obtaining information of the status of the uninterruptible power supply from at least one sensor embedded within or connected to the uninteruptible power supply.

4. The method of claim 2, further comprising the step of terminating the procedure upon determining that a recovery step is not available.

5. The method of claim 2, further comprising displaying a listing of all steps in the procedure.

* * * * *

UNITED STATES PATENT AND TRADEMARK OFFICE
CERTIFICATE OF CORRECTION

PATENT NO. : 7,509,529 B2 Page 1 of 1
APPLICATION NO. : 10/622952
DATED : March 24, 2009
INVENTOR(S) : David A. Colucci et al.

It is certified that error appears in the above-identified patent and that said Letters Patent is hereby corrected as shown below:

Column 6, Claim 2, line 25, before --method-- insert --A--.

Signed and Sealed this

Twenty-ninth Day of September, 2009

David J. Kappos
*Director of the United States Patent and Trademark Office*